Jan. 22, 1929.  
T. A. T. RYDBERG  
1,700,078  
MOTION TRANSMITTING DEVICE FOR AUTOMOBILES OR THE LIKE  
Filed July 14, 1922    2 Sheets-Sheet 1
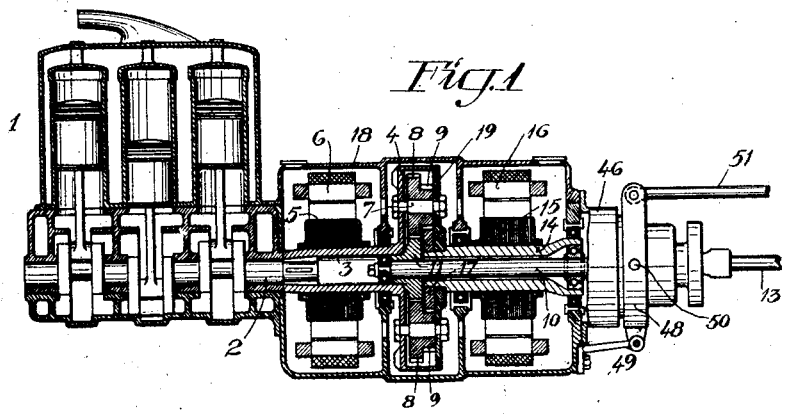
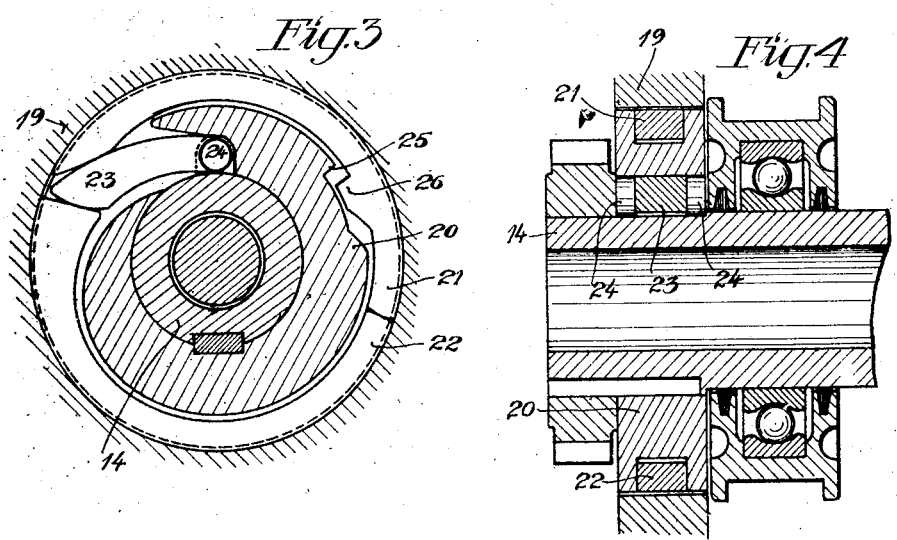
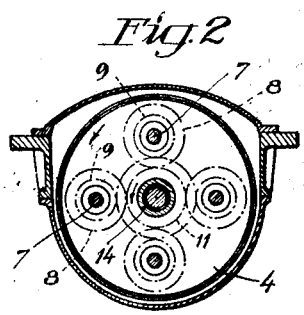
Inventor  
T. A. T. Rydberg  
By Marks & Clerk  
Att'ys Jan. 22, 1929.

T. A. T. RYDBERG 1,700,078

MOTION TRANSMITTING DEVICE FOR AUTOMOBILES OR THE LIKE

Filed July 14, 1922    2 Sheets-Sheet 2

Patented Jan. 22, 1929.

1,700,078

UNITED STATES PATENT OFFICE.

THORSTEN ALBIN THEODOR RYDBERG, OF STOCKHOLM, SWEDEN.

MOTION-TRANSMITTING DEVICE FOR AUTOMOBILES OR THE LIKE.

Application filed July 14, 1922, Serial No. 575,085, and in Sweden July 26, 1921.

As is well known, a characteristic feature of internal combustion engines consists in the power being reduced in the same degree as the number of revolutions of the engine decreases. In order to enable the engine to drive a car under varying conditions of the road and the wind or varying load of the engine a change speed gear is used, whereby when the load changes, the ratio of transmission is changed by placing different gear wheels into engagement with each other. Gears of this type, however, involve essential drawbacks, such as shocks, jerks, great wear and even the destruction of the whole gear. For hilly roads and those in bad condition, the gear must be changed more often, and in order in some degree to reduce the number of said changes more powerful engines are used.

This invention relates to a device, by means of which the changing of the gear by the operator is entirely obviated and the changing takes place quite automatically and instantaneously, so that the engine, like steam-engines, is able to drive the car softly and without jerks when increasing the load and when reducing the number of revolutions.

For obtaining this object an electric generator, according to the invention, is combined with the engine, which generator delivers current to an electric motor which actuates a governing gear provided between the engine and the driving wheels of the car and is so constructed that the electric motor changes the ratio of transmission when the load is increased and the velocity of the electric motor is reduced, so that the engine is enabled to drive the car. The speed of the car is governed by varying the amount of fuel by means of the ordinary pedal or the corresponding governing member provided on the steering wheel and by means of the break.

The invention is illustrated in the accompanying drawings, in which:

Figure 1 shows in a vertical longitudinal section an aggregate, consisting of an internal combustion engine, a dynamo, an electric motor and a governing gear effecting the said automatic changing of the ratio of transmission;

Figure 2 shows in a side view the fly-wheel of the engine and the governing gear provided in the same;

Figures 3 and 4 show in a cross section and a longitudinal section respectively a catching device belonging to the said aggregate.

Figure 5:
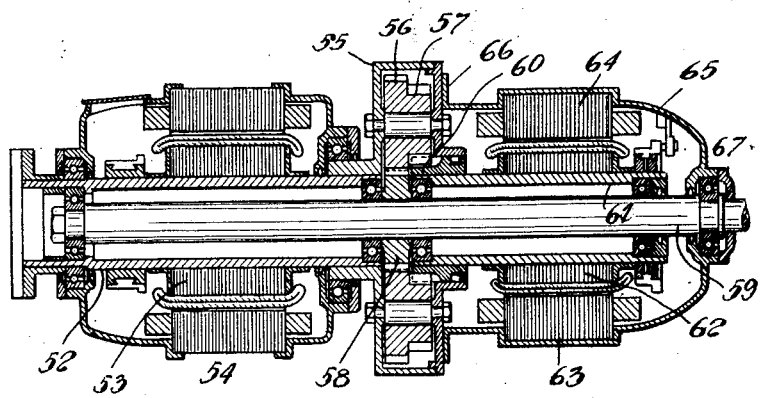
Figs. 5 and 6 are vertical longitudinal sections of two aggregates arranged in accordance with the invention, the engine being omitted.

1, Fig. 1 is the internal combustion engine, which may be a four stroke cycle engine, a two stroke cycle engine or engine of any other type, the power of which is increased as the number of revolutions is increased. 2 is the shaft of the engine. On the said shaft, the hub 3 of the fly-wheel 4 is fixed. The said hub 3 carries the armature 5 of the dynamo 6. The fly-wheel 4 is hollow and to the same pins 7 are fixed carrying toothed wheels 8 and toothed wheels 9 made integral with the wheels 8 respectively. A coaxial shaft 10 carries a toothed wheel 11, engaging the wheels 8. The said shaft 10 is connected with a shaft 13 by a reversing gear 12 (shown in Fig. 5 and described below) and the shaft 13 transmits the motive power to the driving wheels of the car. A sleeve shaped shaft 14, slid on the shaft 10, carries the rotor 15 of a series wound, continuous current motor 16 or, it may be, a single-phase motor and is provided with a toothed wheel 17, engaging the wheels 9. The said motor 16 receives current from the dynamo driven by the engine 1 and consumes a greater amount of current and develops a greater amount of power as the number of revolutions is reduced by the load. Hub 3 and shaft 14 rotate in ball bearings provided in a casing 18 enclosing the dynamo 6, the fly-wheel 4 and the motor 16, while the shaft 10 is journalled in ball bearings provided in the hub 3 and the shaft 14. Between the shaft 14 and a ring shaped cover 19 fixed to the hollow fly-wheel a catching device is provided, shown in Figures 3 and 4. The said catching device comprises a ring 20 fixed to the shaft 14. In a groove provided in the outer peripheral surface of the said ring two sections 21, 22 of a frictional ring are mounted, which co-operate with the inner cylindrical surface of the cover 19. A wedge-shaped member 23 enters into the space between two ends of the sections 21, 22 and is pivoted at 24 in a recess provided in the ring 20. The latter has an abutment 25 co-operating with a projection 26 on one 21 of the said sections.

The described device operates in the following manner. The toothed wheel 17 of the sun and planet gear wheels provided in the fly-wheel is twice as great as the toothed wheels 9, while the wheels 8 and 11 are equal in size. The engine and the electric motor rotate in the same direction. If now the number of revolutions per minute of the rotor 15 of the motor 16 together with the toothed wheel 17 is half as great as the number of revolutions of the engine shaft 2 together with the fly-wheel 4 and the wheels 8, 9, no rotary motion will be imparted to the shaft 10 and the car is stationary. If, on the other hand, the revolutions of the motor 15 and those of the fly-wheel 4 are equal in number, the shaft 10 will be driven at the same number of revolutions and in the same direction as the fly-wheel 4 and the rotor 15, or, in other words, the motion is transmitted directly from the engine shaft 2 to the shaft 10 and the ratio of transmission will be 1 : 1. Between the stationary position of the shaft 10 and the ratio of transmission just stated any desired ratio of transmission between the shafts 2 and 10 may exist. If, on the other hand, the car is stationary while the shaft 10 is coupled to the driving wheels of the car and the electric connection between the dynamo 6 and the motor 16 is broken, the engine 1 will rotate the rotor 15 at a number of revolutions which is half as great as the number of revolutions of the shaft 2 and the fly-wheel. If the number of revolutions of the engine 1 is increased by increasing the amount of fuel the number of revolutions of the rotor 15 is increased, but remains half as great as the number of revolutions of the engine 1, and if the electric connection between the dynamo 6 and the motor 16 is closed so that the dynamo delivers current to the motor, the said current at its maximum strength will pass through the stator and the rotor of the motor, so that the velocity of the rotor 15 is increased and the number of revolutions of the same becomes greater than half the number of revolutions of the fly-wheel 4, which will result in the shaft 10 and the car being put in motion. After the starting of the car its resistance will decrease, for which reason the load of the motor 16 is reduced and the number of revolutions of the rotor 15 increased until a state of equilibrium of the fly-wheel 4, the rotor 15 and the shaft 10 is obtained. If a still greater amount of fuel is supplied to the engine 1, a new state of equilibrium of the fly-wheel 4, the rotor 15 and the shaft 10 will be obtained and the velocity of the car is increased. If there is resistance, for instance, a hill or a bad road, the number of revolutions of the rotor 15 is reduced owing to the increased load, and at the same time in consequence of the sun and planet gear wheels, a corresponding ratio of velocity of the fly-wheel 4 and the shaft 10 is obtained so that the number of working strokes of the engine pistons for each revolution of the shaft 10 becomes greater than before.

Consequently, if the resistance effected by the road increases, the number of revolutions of the motor is reduced, its power being thereby increased. At the same time a corresponding ratio of transmission successively is effected, which facilitates the action of the engine, an automatic equalizing being thereby effected so that the engine will be able to overcome the resistance of the road without jerks. The speed of the car decreases with the new ratio of transmission, but by admitting a greater quantity of fuel the velocity of the engine 1 and the car may be increased, so that the speed of the car may be maintained. Consequently the speed of the car is regulated only by means of the fuel controlling pedal or the corresponding controlling member on the hand steering wheel.

The object of the catching device, Figures 3 and 4, is to prevent the electric motor from running faster than the internal combustion engine and from racing when driving downhill. The said catching device operates in such a manner that if the motor 15 together with the shaft 14 and the ring 20 rotate faster than the engine 1 together with the fly-wheel 4, the wedge 23 will force the sections 21, 22 away from each other and lock the same to the cover 19 of the fly-wheel so that the rotor is locked to the latter. When on the other hand the fly-wheel 4 rotates faster than the rotor, the sections 21, 22 are rotated by the friction between the same and the cover 19 until the projection 26 of the section 21 strikes the abutment 25. The wedge 23 is now withdrawn from the space between the ring sections so that the said locking is interrupted. The catching device may evidently be constructed in any other manner than the one illustrated in the drawings.

The invention may be modified in many respects without exceeding the limits of the invention. In the example shown and described motive power is conveyed to the sun and planet gear wheels partly through the pins 7 and partly through the central toothed wheel 17 and is transmitted by the second central toothed wheel 11. The aggregate may, however, be so arranged that the motive power is conveyed through both the central wheels 11 and 17 and is transmitted by the pins 7 and the shaft 2. Fig. 5 shows a form of the invention, in which the field magnets of the electric motor rotate with the fly-wheel. The hollow shaft 52 is connected with the shaft (not shown) of the internal combustion engine and carries the armature 53 of the dynamo 54 and also the fly-wheel 55 containing the planet gear wheels 56 and 57. The planet gear wheels 56 mesh with the toothed wheel 58, fixed to the shaft 59, which is journaled inside the shaft 52, and the planet gear wheels 57 mesh with the toothed wheel 60 fixed to the hollow shaft 61 of the rotor 62 of the motor 63. The field-magnets 64 of the said motor 63 are fixed to a casing 65, which at 66 is connected with the fly-wheel 55 and at 67 is journaled on the shaft 59.

The aggregate shown in Fig. 5 operates in substantially the same manner as the aggregate shown in Fig. 1. The field-magnets 64 rotate with the fly-wheel, the sun and planet gear being so arranged, that the fly-wheel and consequently the field-magnets rotate in the same direction as the rotor 62. Consequently, when motion is transmitted directly from the shaft 52 to the shaft 59 and the ratio of transmission is 1:1, as explained above with reference to Figs. 1 and 2, the field-magnets 64 will rotate at the same number of revolutions as the rotor 61. The motor 63 then does not operate and may be short-circuited.

A further modification of the invention consists in the field magnets of the generator instead of those of the motor rotating with the fly-wheel.

Figure 6:
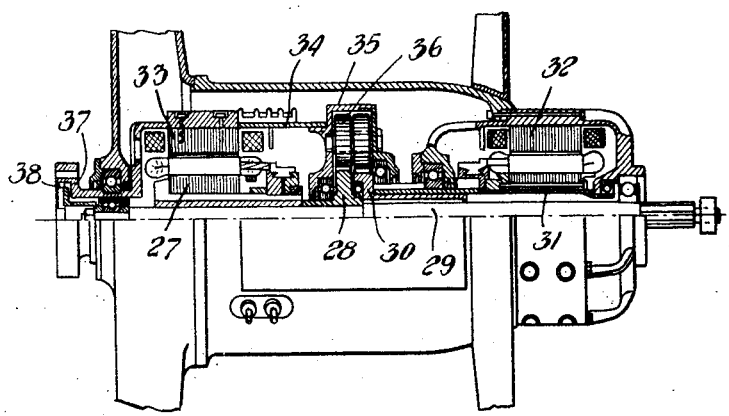

Fig. 6 shows an aggregate thus arranged.

In Fig. 6 the rotor 27 of the electric generator and the one central wheel 28 of the sun and planet gear are fixed to the propelling shaft 29, transmitting the motion to the driving wheels of the car. The other central wheel 30 of the said gear is connected with the rotor 31 of the electric motor, the field-magnets 32 of which are stationary. The field-magnets 33 of the generator are fixed to a casing 34, connected with the fly-wheel 35, carrying the planet wheels 36, and are rotated by the internal combustion engine, the shaft of which is firmly connected with the hub 37 of the said casing 34. 38 represents a catching device substantially of the type shown in Figs. 3 and 4 and adapted to directly connect the shaft of the engine and the shaft 29, in accordance with the above description.

The aggregate operates in substantially the same manner as described above with reference to Fig. 1. By the generator 27, 33 a part of the mechanical energy of the internal combustion engine is converted into electrical energy, which by the electric motor, 31, 32 is again converted into mechanical energy. The other part of the mechanical energy of the driving shaft is transmitted by the sun and planet gear directly to the propelling shaft 29.

The ratio of transmission of the wheels of the sun and planet gear wheels may differ from that stated above. The governing gear may consist of simple sun and planet gear wheels, as shown, or of a differential gear, and instead of cylindrical toothed wheels, bevel wheels may be used. Chains and sprocket wheels may also be used and the parts of the aggregate may be combined in a manner different from that shown in the drawing, the construction of the gear being adapted to the type of automobile, tractor, or the like which is employed.

I claim:

1. In an electro-mechanical transmission for motor cars and the like including a propelling shaft, an engine, an electric generating machine including a field-magnet and an armature, an electric motor machine including a field-magnet and an armature, a gear mechanism interposed between the engine and the propelling shaft, said gear mechanism being connected with the generator and motor and the latter controlling the ratio of gear, and a connecting device interposed between the engine and, a central wheel of said gear mechanism and acting automatically, when the velocity of the propelling shaft attains the velocity of the engine to connect the engine with the propelling shaft and gear mechanism.

2. An electro-mechanical transmission as claimed in claim 1 characterized by the provision of means connecting the field-magnets of one of the electric machines with the engine, whereby their attracting action on the armature aids in rotating the propelling shaft.

3. An electro-mechanical transmission as claimed in claim 1 characterized in that said connecting device includes frictional ring sections, a member rotating with the engine and cooperating with said ring sections, and a wedge-shaped member adapted to expand the ring sections.

In testimony whereof I have affixed my signature.

THORSTEN ALBIN THEODOR RYDBERG.